US008675292B2

(12) United States Patent
Wang et al.

(10) Patent No.: US 8,675,292 B2
(45) Date of Patent: Mar. 18, 2014

(54) PROJECTION LENS AND PROJECTION APPARATUS

(75) Inventors: Kuo-Chuan Wang, Hsinchu (TW); Yi-Hao Kang, Hsinchu (TW); Chi-Tang Hsieh, Hsinchu (TW); Chia-Chang Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 35 days.

(21) Appl. No.: 13/273,210

(22) Filed: Oct. 13, 2011

(65) Prior Publication Data

US 2012/0212841 A1 Aug. 23, 2012

(30) Foreign Application Priority Data

Feb. 18, 2011 (TW) .............................. 100105494 A

(51) Int. Cl.
*G02B 13/16* (2006.01)

(52) U.S. Cl.
USPC ............ 359/784; 359/649; 359/651; 359/754

(58) Field of Classification Search
USPC .................... 359/650–651, 755–783
See application file for complete search history.

(56) References Cited

U.S. PATENT DOCUMENTS

| | | | | |
|---|---|---|---|---|
| 6,076,931 | A | * | 6/2000 | Bone et al. ................ 353/100 |
| 6,111,703 | A | * | 8/2000 | Hozumi ................ 359/772 |
| 6,144,503 | A | * | 11/2000 | Sugano ................ 359/749 |
| 6,439,726 | B1 | | 8/2002 | Piehler |
| 6,784,946 | B1 | | 8/2004 | Schroter et al. |
| 7,517,094 | B2 | | 4/2009 | Piehler |
| 7,580,206 | B2 | | 8/2009 | Chang |
| 2006/0139581 | A1 | * | 6/2006 | Piehler ........................ 353/99 |
| 2010/0309443 | A1 | | 12/2010 | Cheng et al. |

FOREIGN PATENT DOCUMENTS

| | | |
|---|---|---|
| CN | 1285928 | 2/2001 |
| CN | 1802587 | 7/2006 |
| TW | 201044018 | 12/2010 |

OTHER PUBLICATIONS

"Search Report of European Counterpart Application", issued on Jul. 5, 2012, p. 1-p. 6.
"Office Action of Taiwan Counterpart Application", issued on Jul. 19, 2013, p. 1-p. 8.
"Office Action of China Counterpart Application", issued on Jul. 3, 2013, p. 1-p. 8.

* cited by examiner

*Primary Examiner* — Evelyn A Lester
*Assistant Examiner* — William Alexander
(74) *Attorney, Agent, or Firm* — Jianq Chyun IP Office

(57) ABSTRACT

A projection lens for projecting an image beam is provided. The image beam is converted by a light valve from an illumination beam irradiating the light valve. The projection lens includes a first lens group, a second lens group, and a third lens group. The first lens group is disposed on a transmission path of the image beam, and has a first optical axis. The second lens group is disposed on both a transmission path of the illumination beam and the transmission path of the image beam, and between the light valve and the first lens group. The second lens group has a second optical axis. The second optical axis is inclined with respect to the first optical axis. The third lens group is disposed on the transmission path of the image beam, and between the first lens group and the second lens group. A projection apparatus is also provided.

26 Claims, 6 Drawing Sheets

PROJECTION LENS AND PROJECTION APPARATUS

CROSS-REFERENCE TO RELATED APPLICATION

This application claims the priority benefit of Taiwan application serial no. 100105494, filed on Feb. 18, 2011. The entirety of the above-mentioned patent application is hereby incorporated by reference herein and made a part of this specification.

BACKGROUND OF THE INVENTION

1. Field of the Invention

The invention relates to an optical device and a display apparatus, and more particularly to a projection lens and a projection apparatus.

2. Description of Related Art

In many types of display apparatuses, the projection apparatus has a feature of projecting an image with large size in a smaller appearance, and thus has the advantage of being irreplaceable. Since projection apparatuses use a projection lens to form an image from the light valve onto a screen, thus the image quality is deeply affected by the quality of the projection lenses. Therefore, a projection lens is a very important optical device in a projection apparatus.

Since a projection apparatus is usually set on a table or mounted on the ceiling, the light valve of the projection apparatus usually must have an offset greater than 100% relative to the optical axis of the projection lens. In other words, the light valve is located on a side of the optical axis, and the optical axis does not pass through the light valve. Therefore, according to the imaging principle, the image projected onto a screen will be located on the opposite side of the optical axis of the projection lens. This way, the image beam projected from the projection apparatus will not be projected onto the table or the ceiling, unable to form the image correctly.

An offset of 100% means when the light valve is precisely located on a side of the optical axis of the projection lens and the optical axis precisely intersects with the edge of the light valve. When the offset of the light valve is 100% or more, it means the offset of the light valve relative to the projection lens is greater, and so the size of the entire optical system is harder to reduce. In order to reduce the size of the optical system to make the projection system be applied in portable electronic devices, a portion of the projection lens on the side opposite to the offset direction of the light valve is cut off. However, this also results in cutting off the clear aperture of the image beam too much and reducing the brightness of the image greatly.

U.S. Pat. No. 7,580,206 discloses a fixed-focus lens including a first positive lens, a second negative lens, a third positive lens, a fourth positive lens, a fifth positive lens, and sixth negative lens. U.S. Pat. No. 6,439,726 discloses an optical system including a light source, a first optical portion, a second optical portion, and a digital micro-mirror device. U.S. Pat. No. 6,784,946 discloses an optical system including a light bulb, a first optical portion, a second optical portion, and a digital micro-mirror device.

SUMMARY OF THE INVENTION

The invention is directed to a projection lens, wherein an image formed by the projection lens has high image quality, and the projection lens has a small volume.

The invention is directed to a projection apparatus, wherein the projection apparatus may project an image with high quality and have a small size.

Other objects and advantages of the invention may be further illustrated by the technical features broadly embodied and described as follows.

In order to achieve one or a portion of or all of the objects or other objects, an embodiment of the invention provides a projection lens adapted to project an image beam. The image beam is converted by a light valve from an illumination beam irradiating the light valve. The projection lens includes a first lens group, a second lens group, and a third lens group. The first lens group is disposed on a transmission path of the image beam and has a first optical axis. The second lens group is disposed on both a transmission path of the illumination beam and the transmission path of the image beam and disposed between the light valve and the first lens group. The second lens group has a second optical axis, and the second optical axis is inclined with respect to the first optical axis. The third lens group is disposed on the transmission path of the image beam and disposed between the first lens group and the second lens group.

Another embodiment of the invention provides a projection apparatus. The projection apparatus includes an illumination system, the aforementioned light valve, and the aforementioned projection lens. The illumination system is configured to provide an illumination beam. The light valve is disposed on the transmission path of the illumination beam for converting the illumination beam into an image beam.

Based on the above, in the projection lens and the projection apparatus of the embodiment of the invention, since the second optical axis of the second lens group is inclined with respect to the first optical axis of the first lens group, the projected image may have an offset relative to the first optical axis greater than 100% in the circumstance that the offset of the light valve relative to the first optical axis is less than 100%. Thus, the projection lens and the projection apparatus of the embodiment of the invention may have a smaller size. In addition, when wanting to cut off a side of the lens of the projection lens in order to further reduce the size of the projection lens and the projection apparatus, the offset of the light valve relative to the first optical axis is less than 100%, thus the cut portion of the lens is the portion of the lens farther from the optical axis. As a result, when reducing the size of the projection lens, the image will still have a greater brightness, causing image projected from the projection apparatus to have a better image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
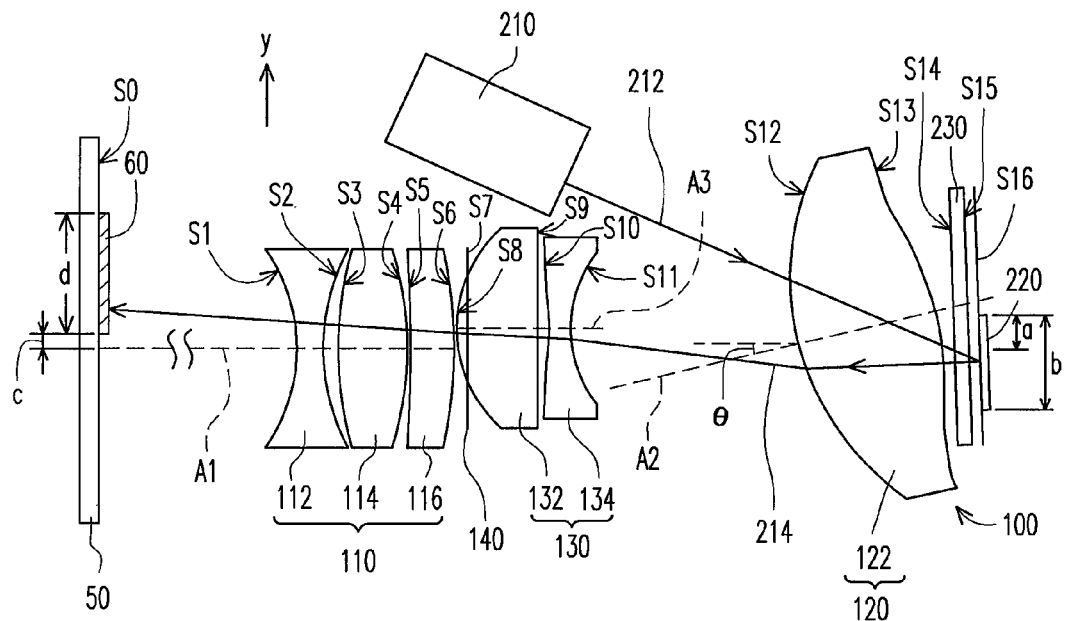
FIG. 1A is a schematic view of a projection apparatus according to an embodiment of the invention.
Figure 1B:
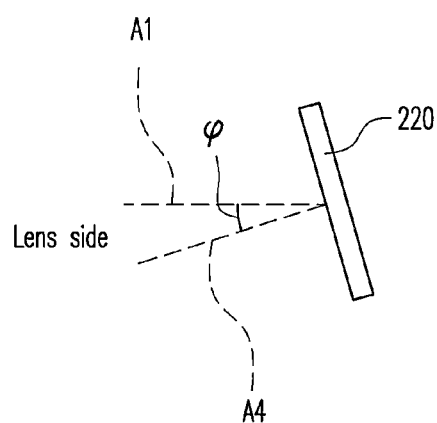
FIG. 1B shows that a fourth optical axis of a light valve of FIG. 1A inclined with respect to a first optical axis.

Referring to FIG. 1A and FIG. 1B, a projection apparatus 200 of the embodiment includes an illumination system 210, a light valve 220, and a projection lens 100. The illumination system 210 is configured to provide an illumination beam 212. In the embodiment, the illumination system 210 may be any system configured to illuminate the light valve 220. The light valve 220 is disposed on a transmission path of the illumination beam 212 for converting the illumination beam 212 into an image beam 214. In the embodiment, the light valve 220 is, for example, a digital micro-mirror device (DMD), a liquid-crystal-on-silicon panel (LCOS panel), or other suitable spatial light modulators (SLM). The projection lens 100 includes a first lens group 110, a second lens group 120, and a third lens group 130. The first lens group 110 is disposed on a transmission path of the image beam 214 and has a first optical axis A1. The second lens group 120 is disposed on both the transmission path of the illumination beam 212 and the transmission path of the image beam 214 and between the light valve 220 and the first lens group 110. The second lens group 120 has a second optical axis A2, and the second optical axis A2 is inclined with respect to the first optical axis A1. The third lens group 130 is disposed on the transmission path of the image beam 214 and between the first lens group 110 and the second lens group 120. The projection lens 100 projects the image beam 214 from the light valve 220 onto a screen 50 to form an image 60. In addition, in the embodiment, a cover glass 230 may be disposed between the second lens group 120 and the light valve 220 to protect the light valve 220.

In the embodiment, each of the first lens group 110 and the third lens group 130 may include at least one lens with a positive refractive power and at least one lens with a negative refractive power. In detail, in the embodiment, the first lens group 110 includes a first lens 112, a second lens 114, and a third lens 116 arranged in sequence from a side far from the light valve 220 to a side close to the light valve 220. The third lens group 130 includes a fourth lens 132 and a fifth lens 134 arranged in sequence from the side far from the light valve 220 to the side close to the light valve 220. The second lens group 120 includes a sixth lens 122. The refractive powers of the first lens 112, the second lens 114, the third lens 116, the fourth lens 132, the fifth lens 134, and the sixth lens 122 are sequentially negative, positive, positive, positive, negative, and positive.

In addition, in the embodiment, each of the first lens group 110 and the third lens group 130 may include at least one aspherical lens. For example, in the embodiment, each of the first lens 112, the second lens 114, the fourth lens 132, the fifth lens 134, and the sixth lens 122 is an aspherical lens, and the third lens 116 is a spherical lens. In other embodiments, the sixth lens 122 may be a spherical lens, but the invention is not limited thereto. In addition, the first lens 112 is, for example, a biconcave lens, the second lens 114 is, for example, a biconvex lens, the third lens 116 is, for example, a concave-convex lens with a convex surface facing the light valve 220, the fourth lens 132 is, for example, a biconvex lens, the fifth lens 134 is, for example, a biconcave lens, and the sixth lens 122 is, for example, a biconvex lens. In addition, in the embodiment, an effective focal length of the second lens group 120 is less than or equal to 15 millimeters. Furthermore, in the embodiment, the projection lens 100 includes an aperture stop 140 disposed, for example, between the first lens group 110 and the third lens group 130. However, in other embodiments, the aperture stop 140 may also be disposed in other position in an imaged lens group formed by the combination of the first lens group 110 and the third lens group 130.

In the projection lens 100 and the projection apparatus 200 of the embodiment, since the second optical axis A2 of the second lens group 120 is inclined with respect to the first optical axis A1 of the first lens group 110, the projected image 60 may have an offset relative to the first optical axis A1 greater than 100% in the circumstance that the offset of the light valve 220 relative to the first optical axis A1 is less than 100%. The offset of the light valve 220 relative to the first optical axis A1 is defined as $(a+b/2)/(b/2)$, wherein a is a distance between an extension line of the first optical axis A1 and the edge of the light valve 220 along the offset direction of the light valve 220 (i.e. a direction parallel to the y direction).

When the extension line of the first optical axis A1 passes through the light valve 220, then a is a negative value. When the extension line of the first optical axis A1 does not intersect with the light valve 220, then a is a positive value. When the extension line of the first optical axis A1 precisely intersects with the edge of the light valve 220, then a is equal to 0. In addition, b is a width of the light valve 220 in the offset direction of the light valve 220 (i.e. a direction parallel to the y direction). In the embodiment, the offset of the light valve 220 relative to the first optical axis A1 is smaller than 100%, which means the extension line of the first optical axis A1 passes through the light valve 220. In addition, the definition of the offset of the image 60 relative to the first optical axis A1 may be referred to the offset of the light valve 220 relative to the first optical axis A1. This means that the offset of the image 60 relative to the first optical axis A1 is defined as (c+d/2)/(d/2), wherein c is a distance between the extension line of the first optical axis A1 and the edge of the image 60 along an offset direction of the image 60 (i.e. a direction parallel to the y direction), and when the extension line of the first optical axis A1 passes through the image 60, then c is a negative value, and the definition of the remaining positive/negative values of c may be realized from the definition of a mentioned above. In addition, d is a width of the image 60 in the offset direction of the image 60.

Since the projected image 60 may have an offset relative to the first optical axis A1 greater than 100% in the circumstance that the offset of the light valve 220 relative to the first optical axis A1 is less than 100%, the projection lens 100 and the projection apparatus 200 of the embodiment may have a smaller size. In other words, compared to conventional projection lens with a light valve optical system where the offset of the light valve is greater than or equal to 100%, the entire projection lens 100 of the embodiment with the light valve 220 may have a shorter height in the offset direction of the light valve 220 (i.e. in a direction parallel to the y direction).

In addition, when wanting to cut off the edge of the lens of the projection lens 100 in order to further reduce the size of the projection lens 100 and the projection apparatus 200, the offset of the light valve 220 relative to the first optical axis A1 is less than 100%, thus the cut portion of the lens is the portion of the lens farther from the optical axis, and so a smaller portion of the clear aperture of the lens would be cut, or even only a non-effective area (i.e. the area of the lens outside the clear aperture) of the lens would be cut. As a result, when reducing the size of the projection lens 100, the image would still have a greater brightness, causing the image projected from the projection lens 100 to have a better image quality. Contrarily, the offset of a conventional light valve relative to the optical axis of the projection lens is greater than or equal to 100%, and when wanting to cut off the edge of the lens, a large portion of the lens equivalent to a large portion of the lens close to the top (i.e. the portion having greater y) in FIG. 1A must be cut off to achieve the same performance obtained by a height in the offset direction (i.e. a direction parallel to the y direction) equivalent to the height of the projection lens 100 of the embodiment. Thus, the conventional method must cut off a larger portion of the clear aperture of the lens, and the brightness of the image is lowered and the image has a lower quality.

In the embodiment, an inclined angle θ of the second optical axis A2 with respect to the first optical axis A1 is greater than or equal to 3 degrees so as to achieve an image 60 with an offset greater than or equal to 100% when the offset of the light valve 220 is smaller. In addition, in the embodiment, a center of a surface (e.g. surface S12) of the second lens group 220 away from the light valve 220 does not locate on the extension line of the first optical axis A1. In other words, besides the second optical axis A2 of the second lens group 120 being inclined with respect to the first optical axis A1, the second lens group 120 may also be decentered with respect to the first optical axis A1. Furthermore, in the embodiment, the third lens group 130 has a third optical axis A3, and the third optical axis A3 is parallel to but does not overlap with the first optical axis A1. It means that the third lens group 130 is decentered with respect to the first lens group 110. In addition, in the embodiment, a fourth optical axis A4 (shown in FIG. 1B) of the light valve 220 is inclined with respect to the first optical axis A1, and the inclined angle φ thereof is, for example, greater than 0.5 degrees. However, in another embodiment, the fourth optical axis A4 of the light valve 220 is not inclined with respect to the first optical axis A1, i.e., the inclined angle φ is 0 degree.

An embodiment of the projection lens 100 is described below. However, it should be noted that the invention is not limited to the data listed in Tables 1, 2, and 3. It should be known to those ordinarily skilled in the art after reading the invention that various modifications and variations may be made to the parameters or settings of the invention, which is still within the scope or spirit of the invention.

TABLE 1

| Surface | Curvature radius (mm) | interval (mm) | Index of Refraction | Abbe Number | Notes |
|---|---|---|---|---|---|
| S0 | infinity | 716.56 | | | Image plane |
| S1 | −4.27 | 0.72 | 1.53 | 56 | First Lens |
| S2 | 5.82 | 0.42 | | | |
| S3 | 17.36 | 1.89 | 1.53 | 56 | Second Lens |
| S4 | −8.35 | 0.1 | | | |
| S5 | −42.82 | 1.2 | 1.77 | 30.52 | Third Lens |
| S6 | −14 | 0.38 | | | |
| S7 | infinity | −0.28 | | | Aperture Stop |
| S8 | 4 | 2.33 | 1.74 | 50.83 | Fourth Lens |
| S9 | −14.37 | 0.21 | | | |
| S10 | −7.4 | 0.63 | 1.64 | 23 | Fifth Lens |
| S11 | 6.15 | 6.3 | | | |
| S12 | 7.51 | 3.89 | 1.49 | 70.06 | Sixth Lens |
| S13 | −5.29 | 0.49 | | | |
| S14 | infinity | 0.4 | 1.51 | 61.19 | Cover Glass |
| S15 | infinity | 0.31 | 0.23 | | |
| S16 | infinity | | | | Object plane |

In Table 1, the interval is a straight line distance between two adjacent surfaces along the optical axis (such as the first optical axis A1, the second optical axis A2, or the third optical axis A3). For example, the interval for the surface S1 is a straight line distance between the surface S1 and a surface S2 along the optical axis A1. The thickness, index of refraction, and Abbe number corresponding to each of the lenses listed in the "Notes" column may be found in the corresponding values for the interval, index of refraction, and Abbe number from each row. Additionally, in Table 1, the surface S0 is the image plane, and the image 60 is projected onto the image plane. The surfaces S1 and S2 are two surfaces of the first lens 112, the surfaces S3 and S4 are two surfaces of the second lens 114, and the surfaces S5 and S6 are two surfaces of the third lens 116. The surface S7 is the aperture stop 140, and the surfaces S8 and S9 are two surfaces of the fourth lens 132, wherein the interval in the row of the surface S7 is a negative value, which means the portion of the surface S8 close to the third optical axis A3 is between the surface S7 and the screen 50 (i.e. the portion of the surface S8 is on the left side of the surface S7 in FIG. 1A). The surfaces S10 and S11 are two surfaces of the fifth lens 134, and the surfaces S12 and S13 are two surfaces of the sixth lens 122. The surfaces S14 and S15 are two surfaces of the cover glass 230, wherein the cover glass 230 may be used for protecting the light valve 220. The surface S16 is the object plane, wherein the active surface of the light valve 220 falls on the object plane.

The radius of curvature, the interval, and other parameters are shown in Table 1, so they are not further described herein.

The above surfaces S1, S2, S3, S4, S8, S9, S10, S11, S12, and S13 are aspheric surfaces with even power, and are expressed by the following formula:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} + \ldots$$

where Z is the sag along the direction of the optical axis, c is the reciprocal of the radius of the osculating sphere, and is also the reciprocal of the radius of curvature near the optical axis (e.g. the radius of curvature for the surfaces S1 and S2 listed in Table 1). k is the conic constant, r is the height of the aspheric surface, where the height is defined as the distance from the center of the lens to the edge of the lens. $A_2$, $A_4$, $A_6$, $A_8$, $A_{10}$, $A_{12}$, $A_{14}$, $A_{16}$ . . . are aspheric coefficients, and the coefficients $A_2$ of the surfaces S1, S2, S3, S4, S8, S9, S10, S11, S12, and S13 of the embodiment are all zero. Table 2 is listed the parameters of the aspheric surfaces for the surfaces S1, S2, S3, S4, S8, S9, S10, S11, S12, and S13.

In addition, the decetering on the y direction is the decetering relative to the first optical axis A1. If the decentering is positive, it means the decentering is in a +y direction from the first optical axis A1, if the decentering is negative, it means the decentering is in a −y direction from the first optical axis A1. Further, the inclined angle of the highest point of the light valve 220 is 1.95 degrees, which means the inclination angle φ of the fourth optical axis A4 of the light valve 220 relative to the first optical axis A1 is, for example, 1.95 degrees.

Figure 2A:
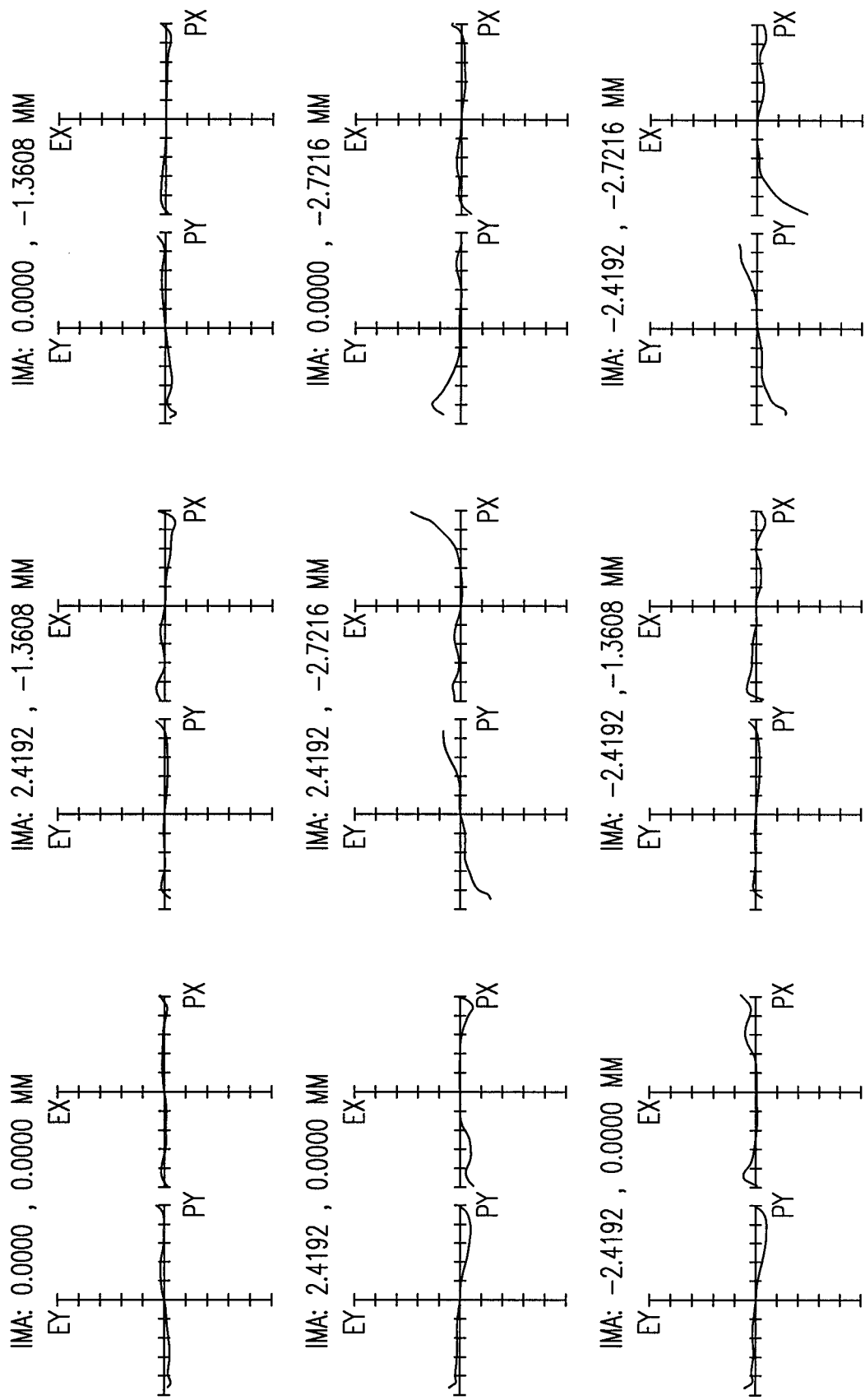
FIGS. 2A through 2C are diagrams showing the optical simulation data of imaging of the projection lens of FIG. 1A.
Figure 2B:
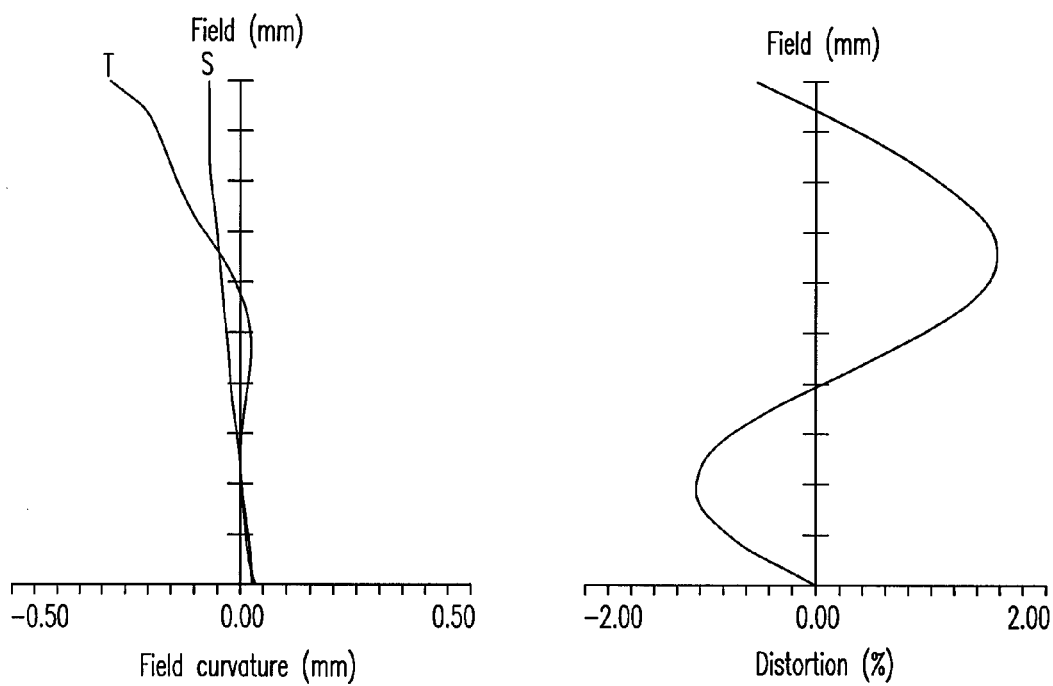
Figure 2C:
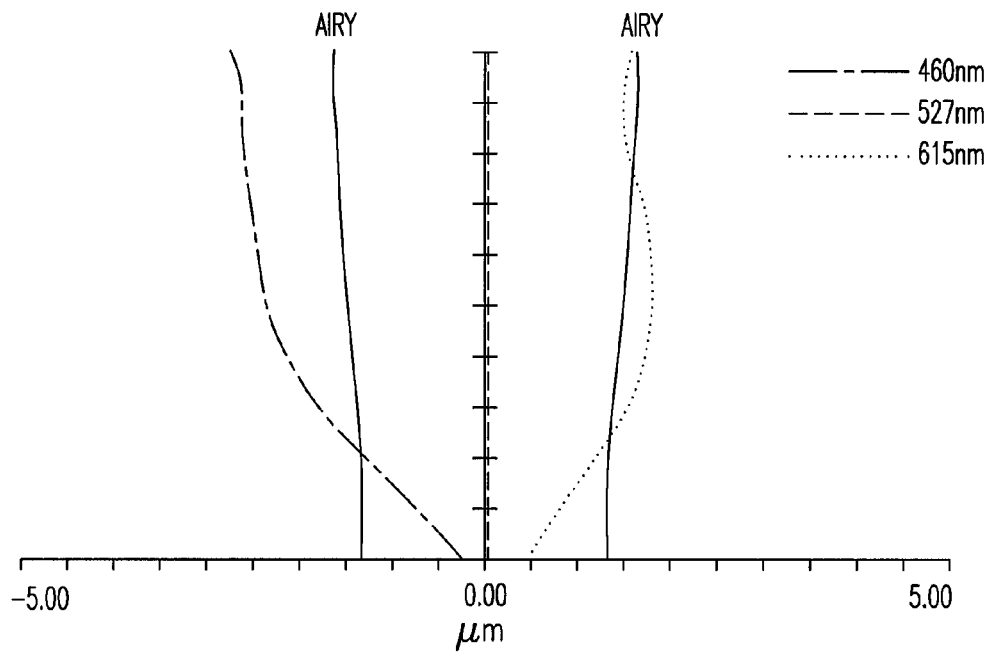

Referring to FIGS. 2A through 2C, FIG. 2A is a transverse ray fan plot of an image and is simulated with a light having wavelength of 527 nm. The maximum and minimum scales of the Ex, Ey, Px, and Py axes of the figure are respectively +50 micrometers and −50 micrometers. Moreover, FIG. 2B shows graphics of a field curvature and a distortion respectively from left to right, and the simulation data diagram is formed with a light having wavelength of 527 nm. FIG. 2C is a lateral color diagram, and is a simulation data diagram obtained with light having wavelengths of 460 nm, 527 nm, and 615 nm. AIRY is the location of an airy disc. The shapes illustrated in FIG. 2A through FIG. 2C are all within a standard range, thereby validating that the projection lens 100 of the embodiment may achieve a good imaging effect.

TABLE 2

| Aspheric Surface Parameter | Conic constant k | Coefficient $A_4$ | Coefficient $A_6$ | Coefficient $A_8$ |
|---|---|---|---|---|
| S1 | 0 | 0.00276849 | 0 | 1.9186E−06 |
| S2 | 0 | −0.00130963 | 9.5925E−05 | −5.868E−06 |
| S3 | 0 | 0.00164426 | 6.629E−05 | 0 |
| S4 | 0 | 0.00088074 | 4.1451E−05 | −2.3129E−06 |
| S8 | 0 | −7.5817E−05 | −8.28E−05 | 1.522E−05 |
| S9 | 0 | 0.00432425 | 9.4742E−05 | −4.0647E−05 |
| S10 | 0 | 0.01573944 | −0.00181089 | 0.000134115 |
| S11 | 0 | 0.01459517 | −0.00095999 | 2.8492E−05 |
| S12 | 0.38 | −0.00111645 | 1.2452E−05 | 4.5789E−06 |
| S13 | −2.27 | 0.00866498 | −0.00081712 | 4.0737E−05 |

| Aspheric Surface Parameter | Coefficient $A_{10}$ | Coefficient $A_{12}$ | Coefficient $A_{14}$ | Coefficient $A_{16}$ |
|---|---|---|---|---|
| S1 | 2.0739E−07 | 0 | 0 | 0 |
| S2 | 3.0975E−08 | 0 | 0 | 0 |
| S3 | 0 | 0 | 0 | 0 |
| S4 | 4.6964E−07 | 0 | 0 | 0 |
| S8 | −9.5563E−07 | 0 | 0 | 0 |
| S9 | 4.4744E−07 | 0 | 0 | 0 |
| S10 | −7.5245E−06 | 0 | 0 | 0 |
| S11 | 2.3333E−05 | 0 | 0 | 0 |
| S12 | −3.3279E−07 | −1.1421E−08 | 1.7647E−09 | −4.0909E−11 |
| S13 | −1.125E−06 | 2.5557E−08 | −3.9159E−10 | −1.6762E−12 |

TABLE 3

| Items | y direction decentering (mm) | Inclined angle (degrees) |
|---|---|---|
| First Lens | 0 | 0 |
| Second Lens | 0 | 0 |
| Third Lens | 0 | 0 |
| Fourth Lens | 0.583 | 0 |
| Fifth Lens | 0.583 | 0 |
| Sixth Lens | 0.162 | 13.89 |
| Highest point of light valve | 1 | 1.95 |

Table 3 is listed the inclined angle and the decentering in the y direction (i.e. a direction parallel to the offset direction of the image 60) of each lens of Table 1. If the inclined angle has a positive value, it means the optical axis inclines in a counterclockwise direction from a horizontal line of FIG. 1A.

Figure 3:
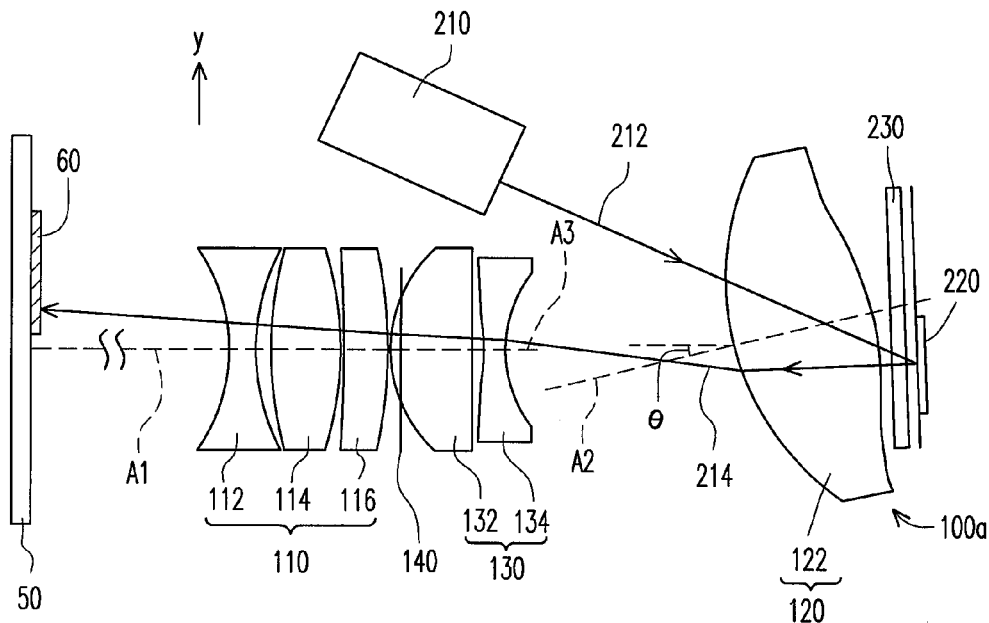
FIG. 3 is a schematic view of a projection apparatus according to another embodiment of the invention.

Referring to FIG. 3, a projection lens 100a of a projection apparatus 200a of the embodiment is similar to the projection lens 100 in FIG. 1A, and the difference between the FIG. 1A and the FIG. 3 is that the third optical axis A3 of the third lens group 130 coincides with the first optical axis A1 of the first lens group 110 in the projection lens 100a. In other words, the third lens group 130 and the first lens group 110 share a common axis and are not decentered from each other.

Figure 4:
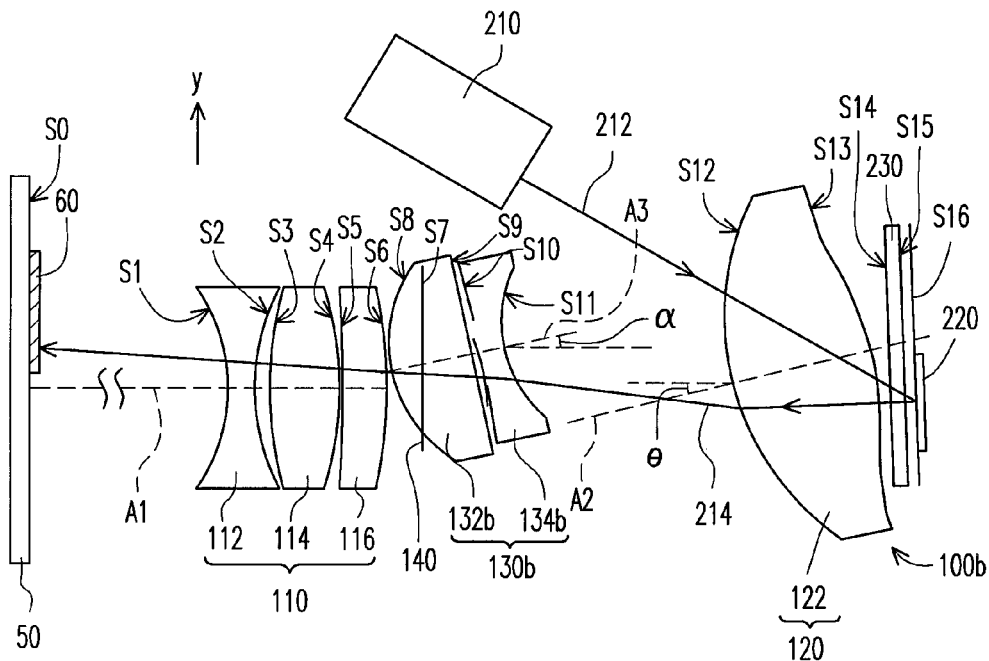
FIG. 4 is a schematic view of a projection apparatus according to another embodiment of the invention.

Referring to FIG. 4, a projection lens 100b of a projection apparatus 200b of the embodiment is similar to the projection lens 100 of FIG. 1A, and the difference between the FIG. 1A and the FIG. 4 is that the third optical axis A3 of the third lens group 130b is inclined with respect to the first optical axis A1 of the first lens group 110 and the inclined angle α of the third optical axis A3 relative to the first optical axis A1 is shown in FIG. 4 in the projection lens 100b.

An embodiment of the projection lens 100b is described below, but the invention is not limited thereto. Please refer to FIG. 4, Table 4, Table 5, and Table 6.

TABLE 4

| Surface | Curvature radius (mm) | Internal (mm) | Index of Refraction | Abbe Number | Notes |
|---|---|---|---|---|---|
| S0 | infinity | 974.53 | | | Image plane |
| S1 | −5.72 | 0.6 | 1.53 | 56 | First Lens |
| S2 | 7.44 | 0.56 | | | |
| S3 | 17.97 | 2.57 | 1.53 | 56 | Second Lens |
| S4 | −11.44 | 0.1 | | | |
| S5 | −32.06 | 1.79 | 1.8 | 29.84 | Third Lens |
| S6 | −15.2 | 1.59 | | | |
| S7 | Infinity | −1.49 | | | Aperture Stop |
| S8 | 35.33 | 3.1 | 1.69 | 53.03 | Fourth Lens |
| S9 | −19.61 | 0.25 | | | |
| S10 | −10.76 | 0.83 | 1.63 | 23.4 | Fifth Lens |
| S11 | 9.55 | 9.36 | | | |
| S12 | 11.13 | 4.6 | 1.52 | 64 | Sixth Lens |
| S13 | −11.42 | 0.54 | | | |
| S14 | infinity | 0.65 | 1.51 | 61.2 | Cover Glass |
| S15 | infinity | 0.71 | | | |
| S16 | infinity | 0 | | | Object plane |

In Table 4, regarding surfaces S1-S7 and S12-S16, please refer to the description for the surfaces S1-S7 and S12-16 of Table 1, which will not be repeated herein. In addition, in Table 4, the surfaces S8 and S9 are two surfaces of the fourth lens 132b of the third lens group 130b, and the surfaces S10 and S11 are two surfaces of the fifth lens 134b of the third lens group 130b.

The surfaces S1, S2, S3, S4, S8, S9, S10, S11, S12, and S13 of Table 4 are aspheric surfaces with even power. Table 5 lists the aspherical parameter values of the surfaces S1, S2, S3, S4, S8, S9, S10, S11, S12, and S13. In the embodiment, the coefficients $A_2$ of the surfaces S1, S2, S3, S4, S8, S9, S10, S11, S12, and S13 are all zero.

TABLE 5

| Aspheric Surface Parameter | Conic constant k | Coefficient $A_4$ | Coefficient $A_6$ | Coefficient $A_8$ |
|---|---|---|---|---|
| S1 | 0 | 0.001102652 | 0 | 2.05E−07 |
| S2 | 0 | −0.000403044 | 1.81E−05 | −4.7E−07 |
| S3 | 0 | 0.000651801 | 1.96E−05 | 0 |
| S4 | 0 | 0.00030465 | 7.05E−06 | −5.68E−08 |
| S8 | 0 | −2.63E−05 | −1.71E−05 | 1.68E−05 |
| S9 | 0 | 0.001757343 | 2.1E−05 | −4.82E−06 |
| S10 | 0 | 0.006218163 | −0.000383867 | 1.62E−05 |
| S11 | 0 | 0.005932952 | −0.000209295 | 3.66E−06 |
| S12 | 0.38 | −0.000336525 | 1.95E−05 | 2.36E−07 |
| S13 | −2.27 | 0.002986497 | −0.000146853 | 4.07E−06 |

| Aspheric Surface Parameter | Coefficient $A_{10}$ | Coefficient $A_{12}$ | Coefficient $A_{14}$ | Coefficient $A_{16}$ |
|---|---|---|---|---|
| S1 | 1.76E−08 | 0 | 0 | 0 |
| S2 | 8.48E−10 | 0 | 0 | 0 |
| S3 | 0 | 0 | 0 | 0 |
| S4 | 2.39E−08 | 0 | 0 | 0 |
| S8 | −5.55E−08 | 0 | 0 | 0 |
| S9 | 5.17E−08 | 0 | 0 | 0 |
| S10 | −4.72E−07 | 0 | 0 | 0 |
| S11 | 1.39E−06 | 0 | 0 | 0 |
| S12 | −1.2E−08 | −2.28E−10 | 2.2E−11 | −3.47E−13 |
| S13 | −3.39E−08 | 9.13E−10 | −6.13E−11 | 8.59E−13 |

TABLE 6

| Items | y direction decentering (mm) | Inclined angle (degrees) |
|---|---|---|
| First Lens | 0 | 0 |
| Second Lens | 0 | 0 |
| Third Lens | 0 | 0 |
| Fourth Lens | 0.63 | 0.28 |
| Fifth Lens | 0.63 | 0.28 |
| Sixth Lens | 0.42 | 9.23 |
| Highest point of light valve | 1. | 1.34 |

Table 6 lists the inclined angle and the decentering in the y direction (i.e. a direction parallel to the offset direction of the image 60) of each lens of Table 4. If the inclined angle has a positive value, it means the optical axis inclines in a counter-clockwise direction from a horizontal line of FIG. 4. In addition, the decentering in the y direction is the decentering relative to the first optical axis A1. If the decentering is positive, it means the decentering is in a +y direction from the first optical axis A1; if the decentering is negative, it means the decentering is in a −y direction from the first optical axis A1. Further, the inclined angle of the highest point of the light valve 220 is 1.34 degrees, which means the inclination angle φ of the fourth optical axis A4 of the light valve 220 relative to the first optical axis A1 is, for example, 1.34 degrees. In addition, as seen in Table 6, besides the fourth lens 132b and the fifth lens 134b being decentered relative to the first lens group 110, the fourth lens 132b and the fifth lens 134b also incline with respect to the first lens group 110. The fourth lens 132b and the fifth lens 134b, for example, incline at 0.28 degrees relative to the first lens group 110.

It should be noted that the invention does not limit the third lens group being decentered or inclined with respect to the first lens group, and does not limit the third lens group and the first lens group to share a common optical axis. In another embodiment, the third lens group may be only inclined with respect to the first lens group, and not decentered with respect to the first lens group. In addition, in an embodiment, the first lens group 110 may be defined as the lens group in the projection lens 100 furthest from the light valve 220, and so the first optical axis A1 of the first lens group 110 may be defined as the optical axis of the lens group furthest from the light valve 220. When the second lens 114 is inclined or decentered with respect to the first lens 112, then only the first lens 112 (i.e. the lens furthest from the light valve 220) may be regarded as the first lens group 110, and the first optical axis A1 is the optical axis of the first lens 112.

Figure 5A:
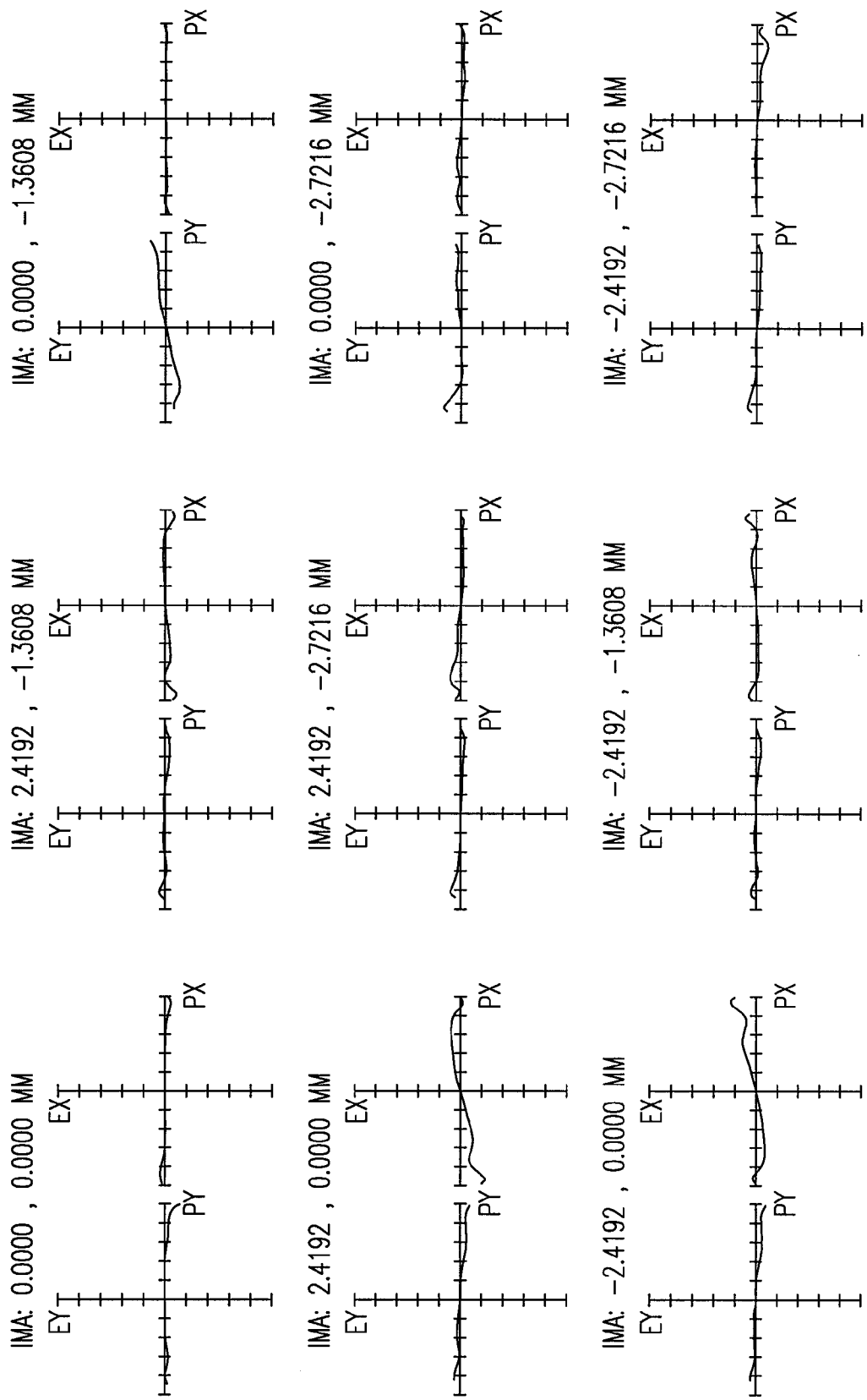
FIGS. 5A through 5C are diagrams showing the optical simulation data of imaging of the projection lens of FIG. 4.
Figure 5B:
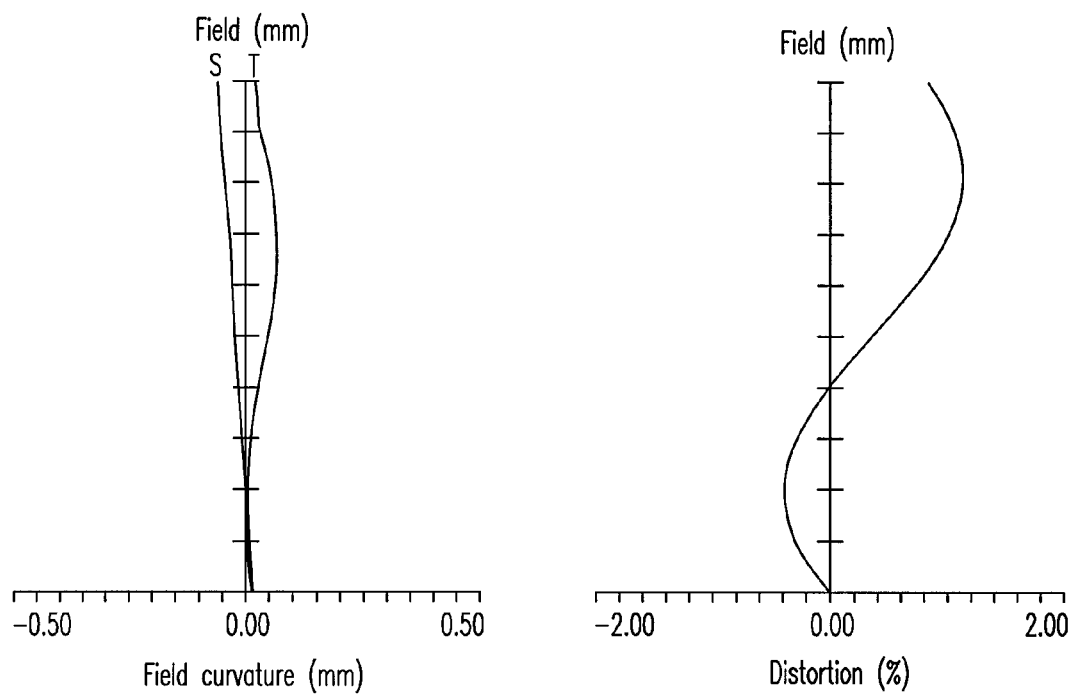
Figure 5C:
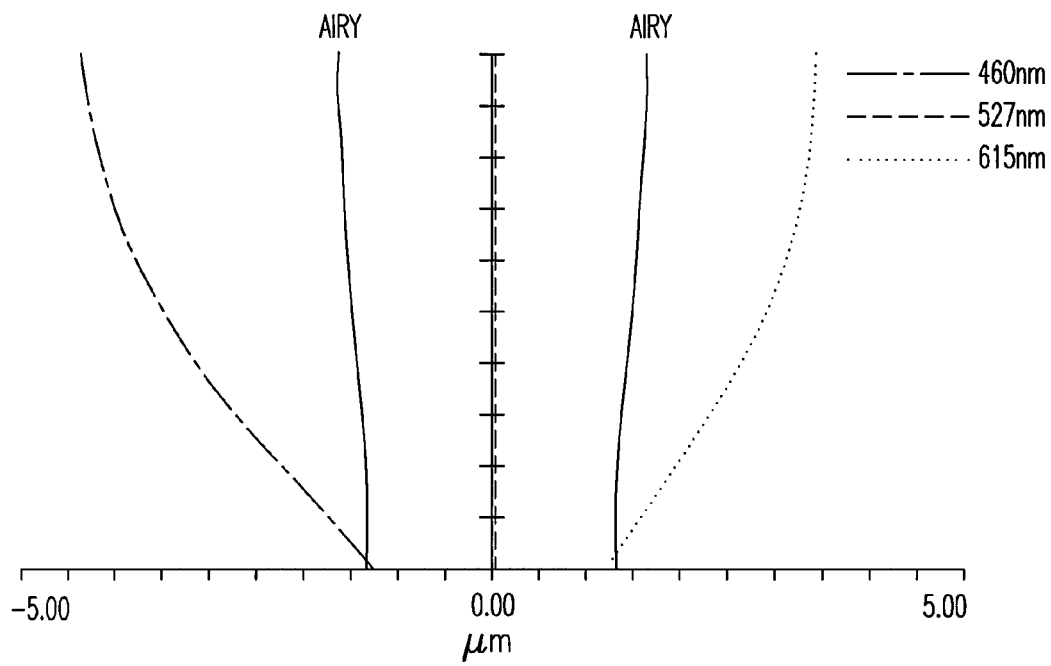

Referring to FIGS. 5A through 5C, FIG. 5A is a transverse ray fan plot of an image and is simulated with a light having wavelength of 527 nm. The maximum and minimum scales of the Ex, Ey, Px, and Py axes of the figure are respectively +50 micrometers and −50 micrometers. Moreover, FIG. 5B shows graphics of a field curvature and a distortion respectively from left to right, and the simulation data diagram is formed with a light having wavelength of 527 nm. FIG. 5C is a lateral color diagram, and is a simulation data diagram obtained with light having wavelengths of 460 nm, 527 nm, and 615 nm. AIRY is the location of an airy disc. The shapes illustrated in FIG. 5A through FIG. 5C are all within a standard range, thereby validating that the projection lens 100b of the embodiment may achieve a good imaging effect.

To sum up, in the projection lens and the projection apparatus of the embodiment of the invention, since the second optical axis of the second lens group is inclined with respect to the first optical axis of the first lens group, the projected image may have an offset relative to the first optical axis greater than 100% in the circumstance that the offset of the light valve relative to the first optical axis is less than 100%. Thus, the projection lens and the projection apparatus of the embodiment of the invention may have a smaller size. In addition, when wanting to cut off an edge of the lens of the projection lens in order to further reduce the size of the projection lens and the projection apparatus, the offset of the light valve relative to the first optical axis is less than 100%, thus the cut portion of the lens is the portion of the lens far from the optical axis. As a result, when the size of the projection lens is reduced, the image will still have a greater brightness and image projected from the projection apparatus to have a better image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", for example first lens group and second lens group, etc. following with noun or element. Such terms should be understood as a nomenclature and should not be construed as giving the limitation on the number of the elements modified by such nomenclature unless specific number has been given.

What is claimed is:

1. A projection lens, adapted to project an image beam, the image beam being converted by a light valve from an illumination beam irradiating the light valve, the projection lens comprising:
    a first lens group, disposed on a transmission path of the image beam, and having a first optical axis;
    a second lens group, disposed on both a transmission path of the illumination beam and the transmission path of the image beam and disposed between the light valve and the first lens group, wherein the second lens group has a second optical axis, and the second optical axis is inclined with respect to the first optical axis; and
    a third lens group, disposed on the transmission path of the image beam and disposed between the first lens group and the second lens group, wherein an offset of an image relative to the first optical axis refers to an offset of the light vale relative to the first optical axis.

2. The projection lens as claimed in claim 1, wherein a center of a surface of the second lens group away from the light valve does not locate on an extension line of the first optical axis.

3. The projection lens as claimed in claim 1, wherein an inclined angle of the second optical axis with respect to the first optical axis is greater than or equal to three degrees.

4. The projection lens as claimed in claim 1, wherein the third lens group has a third optical axis and the third optical axis is parallel to and does not overlap with the first optical axis.

5. The projection lens as claimed in claim 1, wherein the third lens group has a third optical axis and the third optical axis is inclined with respect to the first optical axis.

6. The projection lens as claimed in claim 1, further comprising:
    an aperture stop, disposed between the first lens group and the third lens group.

7. The projection lens as claimed in claim 1, wherein each of the first lens group and the third lens group includes at least one lens with a positive refractive power and at least one lens with a negative refractive power.

8. The projection lens as claimed in claim 1, wherein each of the first lens group and the third lens group includes at least one aspherical lens.

9. The projection lens as claimed in claim 1, wherein the first lens group includes a first lens, a second lens, and a third lens arranged in sequence from a side far from the light valve to a side close to the light valve, the third lens group includes a fourth lens and a fifth lens arranged in sequence from the side far from the light valve to the side close to the light valve, the second lens group includes a sixth lens, wherein refractive powers of the first lens, the second lens, the third lens, the fourth lens, the fifth lens, and the sixth lens are sequentially negative, positive, positive, positive, negative, and positive.

10. The projection lens as claimed in claim 9, wherein each of the first lens, the second lens, the fourth lens, and the fifth lens is an aspherical lens.

11. The projection lens as claimed in claim 9, wherein the first lens is a biconcave lens, the second lens is a biconvex lens, the third lens is a concave-convex lens with a convex surface facing the light valve, the fourth lens is a biconvex lens, the fifth lens is a biconcave lens, and the sixth lens is a biconvex lens.

12. The projection lens as claimed in claim 1, wherein an extension line of the first optical axis passes through the light valve.

13. The projection lens as claimed in claim 1, wherein an effective focal length of the second lens group is less than or equal to 15 millimeters.

14. A projection apparatus, comprising:
    an illumination system, for providing an illumination beam;
    a light valve, disposed on a transmission path of the illumination beam for converting the illumination beam into an image beam; and
    a projection lens, comprising:
        a first lens group, disposed on a transmission path of the image beam, and having a first optical axis;

a second lens group, disposed on both a transmission path of the illumination beam and the transmission path of the image beam and disposed between the light valve and the first lens group, wherein the second lens group has a second optical axis, and the second optical axis is inclined with respect to the first optical axis; and a third lens group, disposed on the transmission path of the image beam and disposed between the first lens group and the second lens group, wherein an offset of an image relative to the first optical axis refers to an offset of the light vale relative to the first optical axis.

15. The projection apparatus as claimed in claim 14, wherein a center of a surface of the second lens group away from the light valve does not locate on an extension line of the first optical axis.

16. The projection apparatus as claimed in claim 14, wherein an inclined angle of the second optical axis with respect to the first optical axis is greater than or equal to three degrees.

17. The projection apparatus as claimed in claim 14, wherein the third lens group has a third optical axis and the third optical axis is parallel to and does not overlap with the first optical axis.

18. The projection apparatus as claimed in claim 14, wherein the third lens group has a third optical axis and the third optical axis is inclined with respect to the first optical axis.

19. The projection apparatus as claimed in claim 14, wherein the projection lens further comprises:
an aperture stop, disposed between the first lens group and the third lens group.

20. The projection apparatus as claimed in claim 14, wherein each of the first lens group and the third lens group includes at least one lens with a positive refractive power and at least one lens with a negative refractive power.

21. The projection apparatus as claimed in claim 14, wherein each of the first lens group and the third lens group includes at least one aspherical lens.

22. The projection apparatus as claimed in claim 14, wherein the first lens group includes a first lens, a second lens and a third lens arranged in sequence from a side far from the light valve to a side close to the light valve, the third lens group includes a fourth lens and a fifth lens arranged in sequence from the side far from the light valve to the side close to the light valve, the second lens group includes a sixth lens, wherein refractive powers of the first lens, the second lens, the third lens, the fourth lens, the fifth lens, and the sixth lens are sequentially negative, positive, positive, positive, negative, and positive.

23. The projection apparatus as claimed in claim 22, wherein each of the first lens, the second lens, the fourth lens, and the fifth lens is an aspherical lens.

24. The projection apparatus as claimed in claim 22, wherein the first lens is a biconcave lens, the second lens is a biconvex lens, the third lens is a concave-convex lens with a convex surface facing the light valve, the fourth lens is a biconvex lens, the fifth lens is a biconcave lens, and the sixth lens is a biconvex lens.

25. The projection apparatus as claimed in claim 14, wherein an extension line of the first optical axis passes through the light valve.

26. The projection apparatus as claimed in claim 14, wherein an effective focal length of the second lens group is less than or equal to 15 millimeters.

* * * * *